US012325342B2

(12) United States Patent
Yamauchi et al.

(10) Patent No.: US 12,325,342 B2
(45) Date of Patent: Jun. 10, 2025

(54) SEAT FRAME

(71) Applicant: NHK Spring Co., Ltd., Yokohama (JP)

(72) Inventors: Yuichiro Yamauchi, Kanagawa (JP); Junichi Nakayama, Yokohama (JP); Atsuki Yoshida, Yokohama (JP); Ryo Tanaka, Yokohama (JP); Hiroki Hayashida, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 64 days.

(21) Appl. No.: 18/033,633

(22) PCT Filed: Oct. 26, 2021

(86) PCT No.: PCT/JP2021/039527
§ 371 (c)(1),
(2) Date: Apr. 25, 2023

(87) PCT Pub. No.: WO2022/107560
PCT Pub. Date: May 27, 2022

(65) Prior Publication Data
US 2023/0398914 A1    Dec. 14, 2023

(30) Foreign Application Priority Data

Nov. 17, 2020   (JP) .................................. 2020-191263

(51) Int. Cl.
B60N 2/68    (2006.01)
(52) U.S. Cl.
CPC ............. B60N 2/686 (2013.01); B60N 2/682 (2013.01)
(58) Field of Classification Search
CPC .................................. B60N 2/682; B60N 2/686
See application file for complete search history.

(56) References Cited

U.S. PATENT DOCUMENTS 10,787,105 B2 *  9/2020  Poulos .................... B60N 2/20
2013/0168371 A1 *  7/2013  Furusako ............... B23K 26/22
                                                           219/121.64
(Continued)

FOREIGN PATENT DOCUMENTS

DE   102013224266 A1 *  3/2015 ........... B60N 2/2893
DE   102019212365 A1 *  2/2021
(Continued)

OTHER PUBLICATIONS

Office Action dated Aug. 6, 2024, issued in the corresponding Japanese patent application No. 2020-191263 and English machine translation thereof.

*Primary Examiner* — Timothy J Brindley
(74) *Attorney, Agent, or Firm* — Troutman Pepper Locke LLP; James E. Armstrong, IV; Joshua L. Jones

(57) ABSTRACT

A seat frame includes: a plate member; and a bar member joined to the plate member, the bar member including a planar portion on at least part of a side surface of the bar member, wherein the plate member and the bar member are joined to each other by a welded portion including a base portion configured to: extend in a longitudinal direction of the bar member; and have a central line positioned closer to a position at which a load from a user is applied upon use of the seat frame than a central portion of the bar member, the central portion being at a center of a length of the bar member, the length being orthogonal to the longitudinal direction of the bar member, the position being in an area of contact between the plate member and the planar portion.

7 Claims, 7 Drawing Sheets

(56) References Cited

U.S. PATENT DOCUMENTS

| | | | | |
|---|---|---|---|---|
| 2019/0061272 A1* | 2/2019 | Wang | ................ | B29C 66/72323 |
| 2019/0359103 A1* | 11/2019 | Inoue | ........................ | B60N 2/68 |
| 2020/0124069 A1 | 4/2020 | Yamauchi et al. | | |
| 2020/0317100 A1 | 10/2020 | Yamauchi et al. | | |
| 2022/0152736 A1* | 5/2022 | Yamamoto | ........... | B23K 26/082 |

FOREIGN PATENT DOCUMENTS

| | | | | |
|---|---|---|---|---|
| EP | 3733517 A1 * | 11/2020 | ......... | B64D 11/0619 |
| JP | H10-236191 A | 9/1998 | | |
| JP | 2018-176226 A | 11/2018 | | |
| JP | 2019-042740 A | 3/2019 | | |
| JP | 2019-64509 A | 4/2019 | | |
| WO | WO-2016046884 A1 * | 3/2016 | ........... | B60N 2/2893 |
| WO | 2018/193839 A1 | 10/2018 | | |
| WO | 2019/098292 A1 | 5/2019 | | |
| WO | WO-2019176697 A1 * | 9/2019 | ............. | B60N 2/005 |

* cited by examiner

SEAT FRAME

FIELD

The present invention relates to seat frames.

BACKGROUND

Strength of seat frames for automobiles has conventionally been obtained by welding of pipes to plate members (see, for example, Patent Literature 1). According to Patent Literature 1, a seat frame is made by joining of a rectangular pipe and a round pipe to a plate member, the rectangular pipe having a rectangular cross section, the round pipe having a circular cross section, the rectangular cross section and circular cross section being cut along a plane orthogonal to a longitudinal direction of these pipes. In general, a pipe and a plate member are joined to each other at a central portion of the pipe, for example, a radially central portion on a cross section of the pipe in a case where the pipe is a circular pipe.

CITATION LIST

Patent Literature

Patent Literature 1: Japanese Unexamined Patent Application, Publication No. H10-236191

SUMMARY

Technical Problem

Shear loads and peeling loads are applied to the plate member and the pipe of the above described seat frame upon use. Both strength against shear and strength against peeling are demanded for seat frames.

The present invention has been made in view of the above and an object thereof is to provide a seat frame that has both strength against shear loads and strength against peeling loads.

Solution to Problem

To solve the above-described problem and achieve the object, a seat frame according to the present invention includes: a plate member; and a bar member joined to the plate member, the bar member including a planar portion on at least part of a side surface of the bar member, wherein the plate member and the bar member are joined to each other by a welded portion including a base portion configured to: extend in a longitudinal direction of the bar member; and have a central line positioned closer to a position at which a load from a user is applied upon use of the seat frame than a central portion of the bar member, the central portion being at a center of a length of the bar member, the length being orthogonal to the longitudinal direction of the bar member, the position being in an area of contact between the plate member and the planar portion.

Moreover, in the above-described seat frame according to the present invention, the welded portion is provided on an opposite side of the central portion of the bar member, the central portion being at the center of the length orthogonal to the longitudinal direction of the bar member, the opposite side being opposite to a side where an outer edge of the plate member is.

Moreover, in the above-described seat frame according to the present invention, the welded portion includes: a first extended portion configured to extend from one end of the base portion in a direction intersecting the longitudinal direction of the bar member; and a second extended portion configured to extend from an other end of the base portion in a direction intersecting the longitudinal direction of the bar member.

Moreover, in the above-described seat frame according to the present invention, the welded portion further includes: a third extended portion configured to extend from an opposite end of the first extended portion in the longitudinal direction of the bar member, the opposite end being opposite to an end of the first extended portion, the end being connected to the base portion; and a fourth extended portion configured to extend from an opposite end of the second extended portion in the longitudinal direction of the bar member, the opposite end being opposite to an end of the second extended portion, the end being connected to the base portion.

Moreover, in the above-described seat frame according to the present invention, the first and second extended portions are configured to extend linearly.

Moreover, in the above-described seat frame according to the present invention, the first and second extended portions are configured to extend in an arc shape.

Moreover, in the above-described seat frame according to the present invention, the welded portion further includes: a connecting portion configured to connect an opposite end of the first extended portion and an opposite end of the second extended portion to each other, the opposite end of the first extended portion being opposite to an end of the first extended portion, the end being connected to the base portion, the opposite end of the second extended portion being opposite to an end of the second extended portion, the end being connected to the base portion.

Moreover, in the above-described seat frame according to the present invention, the bar member has a rectangular cross section cut along a plane orthogonal to the longitudinal direction.

Moreover, in the above-described seat frame according to the present invention, the bar member is tubular.

Moreover, in the above-described seat frame according to the present invention, the plate member and the bar member are made of aluminum or an aluminum alloy.

Advantageous Effects of Invention

The present invention has an effect of enabling achievement of both strength against shear loads and strength against peeling loads.

DESCRIPTION OF EMBODIMENTS

Modes for implementing the present invention will be described in detail hereinafter, together with the drawings. The present invention is not limited by the following embodiments. Furthermore, the drawings referred to in the description hereinafter illustrate shapes, sizes, and positional relations merely schematically so as to enable subject matter of the present invention to be understood. That is, the present invention is not limited just to the shapes, sizes, and positional relations exemplified by the drawings.

Embodiment

Figure 1:
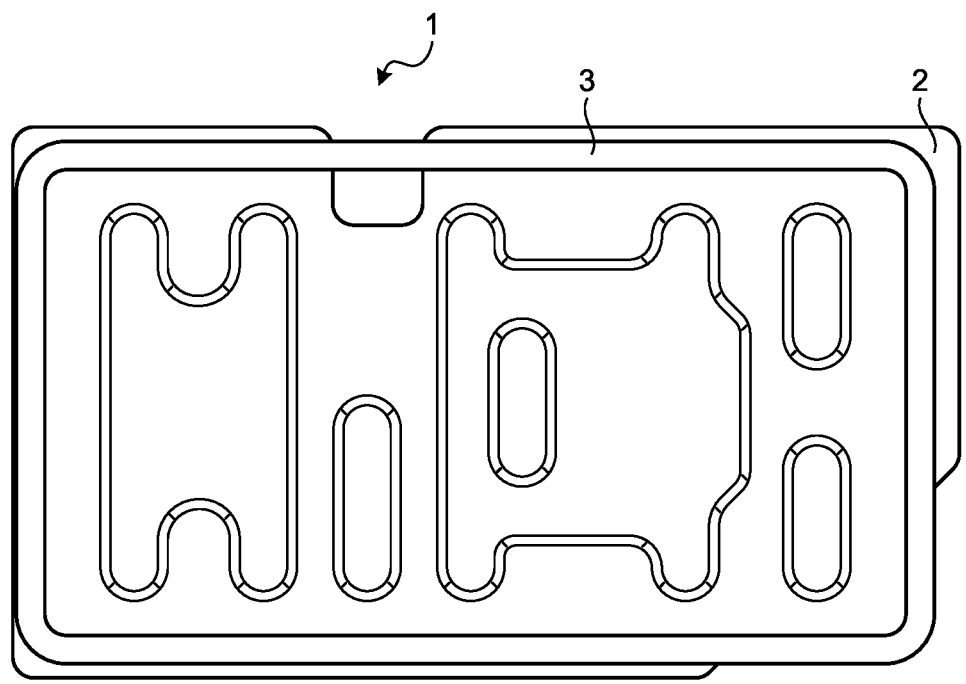
FIG. 1 is a front view of an automobile seat frame according to an embodiment of the present invention.
Figure 2:
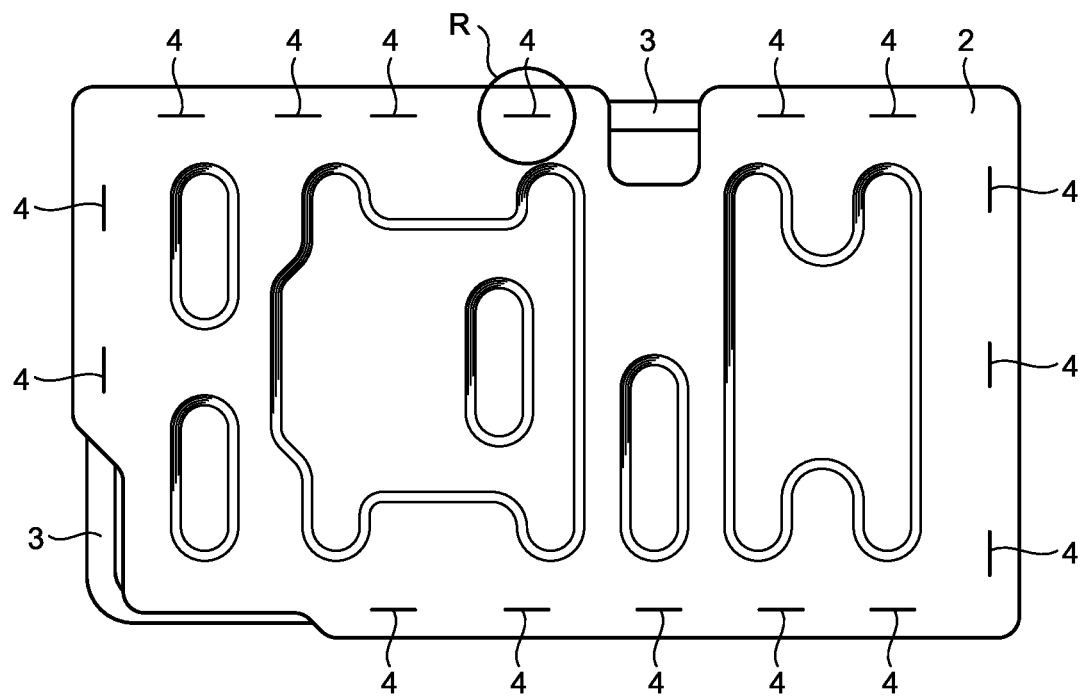
FIG. 2 is a rear view of the automobile seat frame in FIG. 1.
Figure 3:
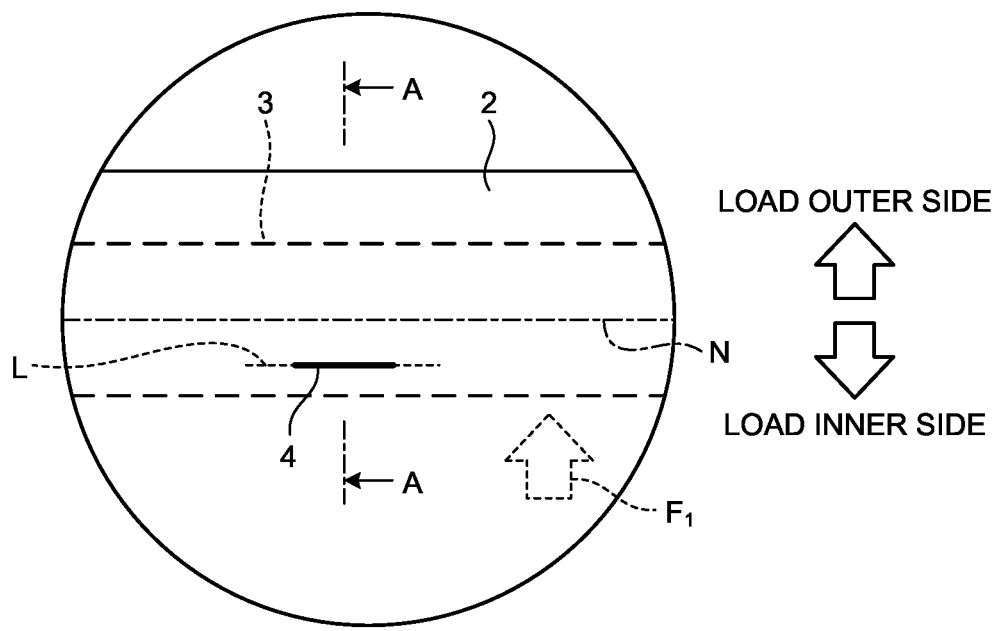
FIG. 3 is an enlarged view of a region R illustrated in FIG. 2.
Figure 4:
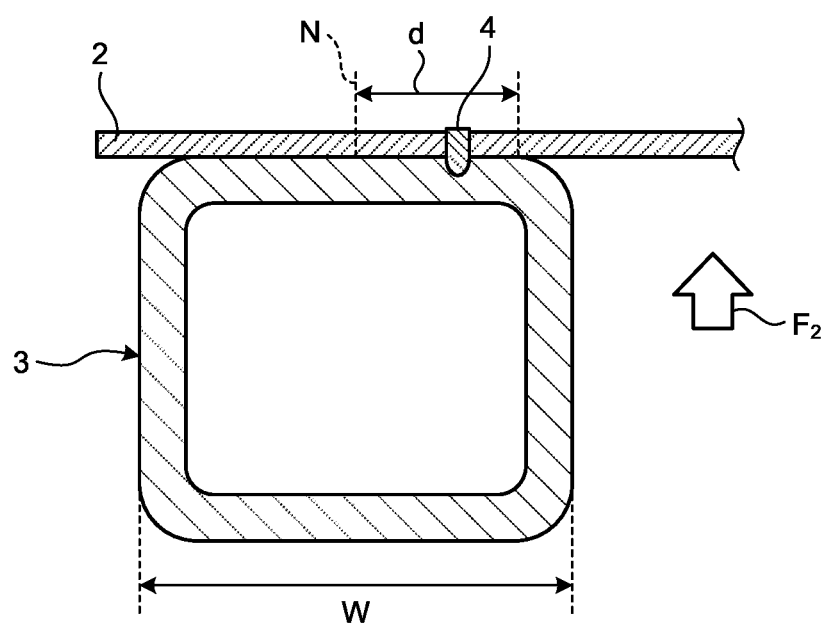
FIG. 4 is a partial enlarged sectional view taken on a line A-A in FIG. 3.

First of all, an automobile seat frame according to an embodiment of the present invention will be described in detail by reference to the drawings. FIG. 1 is a front view of the automobile seat frame according to the embodiment of the present invention. FIG. 2 is a rear view of the automobile seat frame in FIG. 1. FIG. 3 is an enlarged view of a region R illustrated in FIG. 2. FIG. 4 is a partial enlarged sectional view taken on a line A-A in FIG. 3.

An automobile seat frame 1 (hereinafter, simply referred to as the seat frame 1) includes a back panel 2 made of aluminum or an aluminum alloy, and a frame pipe 3 made of aluminum or an aluminum alloy. The back panel 2 and the frame pipe 3 in the seat frame 1 are joined to each other and the frame pipe 3 is thereby fixed to the back panel 2.

The back panel 2 is a thin plate made of aluminum or an aluminum alloy and is formed by, for example, press working. The aluminum alloy adopted for the back panel 2 is preferably high in strength but in terms of ease of forming, examples of the aluminum alloy include those of the 5000 series (Al—Mg series) and 6000 series (Al—Mg—Si series).

The frame pipe 3 is a pipe having a rectangular cross section and made of aluminum or an aluminum alloy (see FIG. 4). Because the frame pipe 3 has a rectangular cross section, the frame pipe 3 has a planar portion in part of a surface of the frame pipe 3. Specifically, four planar portions and four corner portions are alternately provided along the periphery of the cross section of the frame pipe 3. The corner portions are arc-shaped. The frame pipe 3 is joined in a state where its planar portion has been brought into contact with the back panel 2. Furthermore, the aluminum alloy adopted for the frame pipe 3 is preferably high in strength and examples of the aluminum alloy include those of the 2000 series (Al—Cu—Mg series), the 5000 series, the 6000 series, and the 7000 series (Al—Zn—Mg series). The frame pipe 3 may have a cross section with a polygonal shape other than a rectangular shape. The frame pipe 3 may be a tubular member or a solid member.

Without being limited to aluminum or an aluminum alloy, other metal, such as iron, or an alloy thereof may be used for the back panel 2 and the frame pipe 3.

The back panel 2 and the frame pipe 3 are joined to each other by a welded portion 4. The welded portion 4 extends linearly in a longitudinal direction of the frame pipe 3. The welded portion 4 is formed by, for example, laser welding. A joined body is formed of the back panel 2, the frame pipe 3, and the welded portion 4. The welded portion 4 may be formed of a line of linear welded marks or plural (for example, three) welded marks lined up in a direction orthogonal to the longitudinal direction of the frame pipe 3.

With respect to this embodiment, one of directions that are orthogonal to the longitudinal direction of the frame pipe 3 is referred to as a width direction of the frame pipe 3, the one extending along a surface of the frame pipe 3, the surface being in contact with the back panel 2. By contrast, a direction rising and extending from the back panel 2 is referred to as a thickness direction of the frame pipe 3. The longitudinal direction corresponds to a direction orthogonal to the above described cross section and is a direction in which the hollow space extends in a case where the frame pipe 3 is pipe-shaped.

A mode of joining between the back panel 2 and the frame pipe 3 will be described next.

Upon use, loads are applied to the seat frame 1 having the back panel 2 and the frame pipe 3 that have been joined to each other. Specifically, when a passenger leans against the seat or when an impact is received from the cargo space, a load is applied to the seat frame 1. When an impact is received from the cargo space, a shear load $F_1$ is applied to a position between the back panel 2 and the frame pipe 3 (see FIG. 3). Furthermore, when a passenger leans against the seat, a peeling load $F_2$ is applied to a position between the back panel 2 and the frame pipe 3 (see FIG. 4). The shear load $F_1$ and the peeling load $F_2$ act on the back panel 2 and the frame pipe 3, in directions different from each other. Specifically, the shear load $F_1$ is a load applied in a direction that moves a joint position between the back panel 2 and the frame pipe 3. By contrast, the peeling load $F_2$ is a load applied in a direction by which the back panel 2 and the frame pipe 3 separate from each other.

The joint position between the back panel 2 and the frame pipe 3 in the seat frame 1 is determined according to the position of the frame pipe 3 in relation to the back panel 2. Specifically, the back panel 2 and the frame pipe 3 are joined to each other at a more inner position of the back panel 2 than a central axis N of the frame pipe 3, the central axis N being at the center of the width of the frame pipe 3. The more inner position of the back panel 2 herein refers to a position toward an opposite outer edge of an area of the back panel 2, the position being near a point where a load is applied, the area being connected to the frame pipe 3, the opposite outer edge being opposite to an outer edge of the area. That is, a load inner side of the central axis N of the frame pipe 3 is near a point where a load is applied in the back panel 2 in a case where the load is applied to the back panel 2 from a passenger who has sat in the seat, for example. On the contrary, a load outer side of the central axis N of the frame pipe 3 is opposite to the side where the point of the load is. The welded portion 4 is formed in a portion where the back panel 2 and a planar portion of the frame pipe 3 contact each other (for example, in a range d illustrated in FIG. 4). Furthermore, although FIG. 3 illustrates a configuration in which the welded portion 4 is provided more to the load inner side than the central axis N of the frame pipe 3, a central line L of the welded portion 4 just needs to be provided more to the load inner side than the central axis N of the frame pipe 3 and part of the welded portion may overlap the central axis N.

In the above described embodiment, the seat frame 1 is made by joining of the back panel 2 and the frame pipe 3 to each other at the more inner position of the back panel 2 than the central axis N of the frame pipe 3, the back panel 2 and the frame pipe 3 each being made of aluminum or an aluminum alloy. This embodiment achieves increased strength against shear and peeling by formation of the welded portion 4 at a position satisfying the above described relation and as a result, enables firm joining of a plate member and a pipe member to each other. Furthermore, because the back panel 2 and the frame pipe 3 are each made of aluminum or an aluminum alloy, weight reduction is able to be achieved as compared to a case where they are made of iron.

The welded portion 4 illustrated in FIG. 2 has been described by reference to an example in which the welded portion 4 is linearly formed by laser welding at plural points, but without being limited to this example, the welded portion 4 may be formed by welding at just one point, for example. Furthermore, the joining between the back panel 2 and the frame pipe 3 is not necessarily linear as long as the joint is on the load inner side. Other modes of the welded portion will be described hereinafter.

First Modified Example

Figure 5:
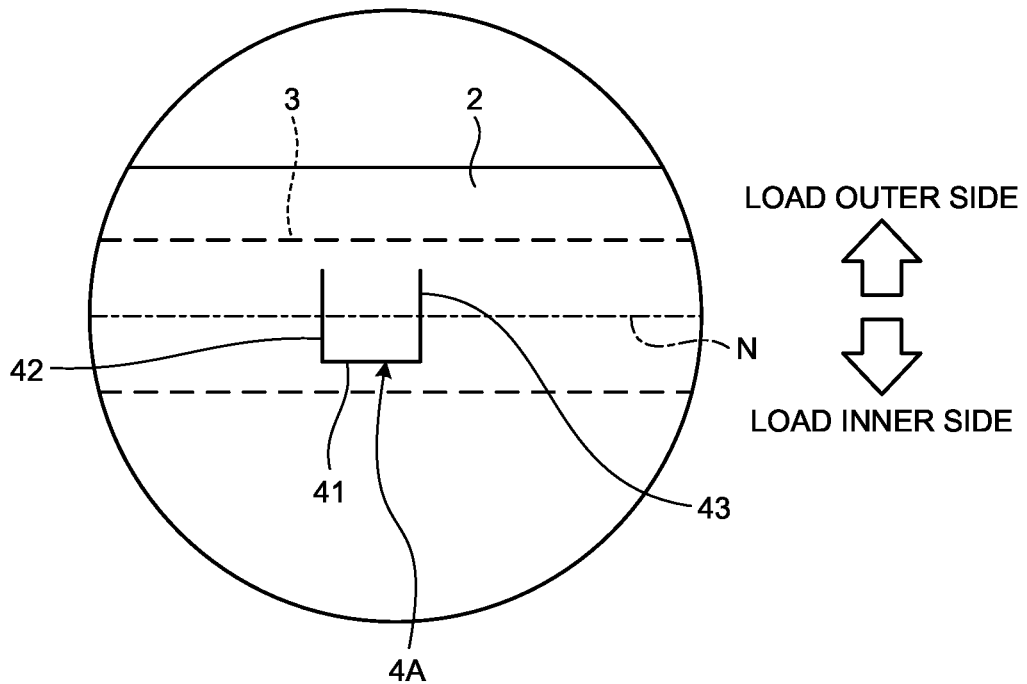
FIG. 5 is a diagram for explanation of a mode of joining in an automobile seat frame according to a first modified example.

FIG. 5 is a diagram for explanation of a mode of joining in an automobile seat frame according to a first modified example. A welded portion 4A is provided in the seat frame according to this first modified example, instead of the welded portion 4 described above. Description of components (the back panel 2 and the frame pipe 3) that are the same as those of the above described embodiment will be omitted hereinafter.

The welded portion 4A has: a base portion 41 provided at a more inner position of the back panel 2 than the central axis N of the frame pipe 3 and linearly extending in the longitudinal direction of the frame pipe 3; a first extended portion 42 linearly extending toward the outside of the back panel 2 from one end of the base portion 41; and a second extended portion 43 linearly extending toward the outside of the back panel 2 from the other end of the base portion 41. Both the first extended portion 42 and second extended portion 43 extend to positions that are more outside than the central axis N of the frame pipe 3.

In this first modified example described above, the back panel 2 and the frame pipe 3 are joined to each other by the welded portion 4A. Similarly to the embodiment, the base portion 41 of the welded portion 4A joins the back panel 2 and frame pipe 3 each made of aluminum or an aluminum alloy to each other at the more inner position of the back panel 2 than the central axis N of the frame pipe 3 to thereby make a seat frame. This first modified example achieves increased strength against shear and peeling by formation of the welded portion 4A at a position satisfying the above described relation and as a result, enables firm joining of a plate member and a pipe member to each other.

Furthermore, the first modified example achieves even more increased strength against shear by provision of the first extended portion 42 and second extended portion 43 extending in a direction in which shear loads are applied.

Second Modified Example

Figure 6:
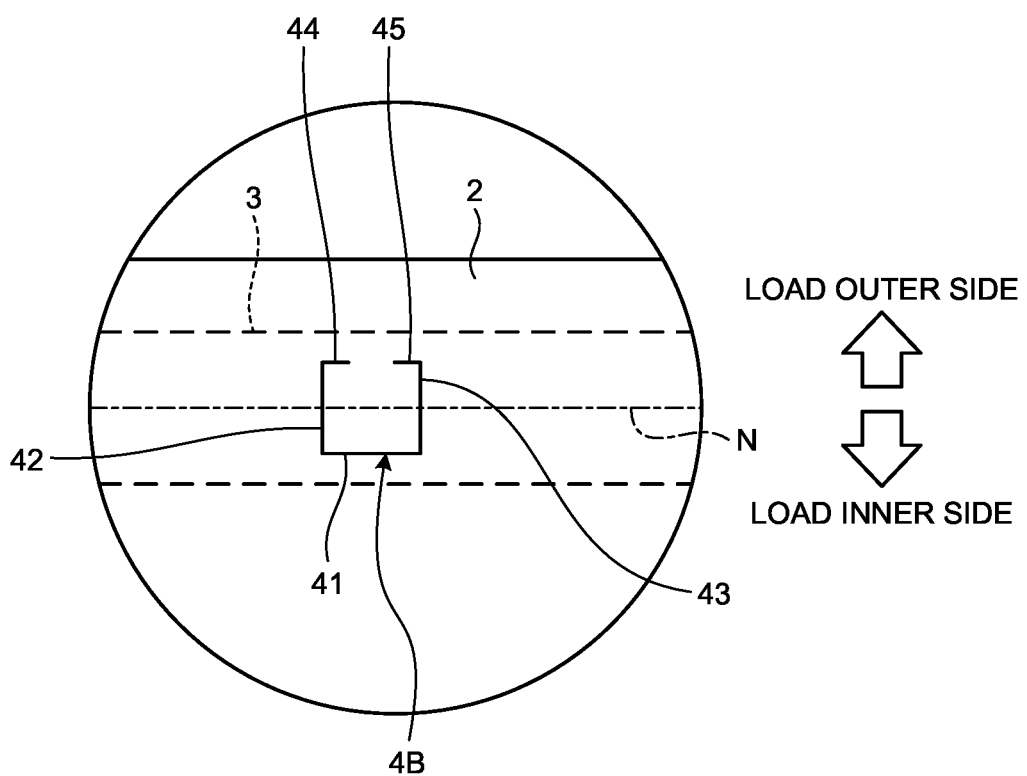
FIG. 6 is a diagram for explanation of a mode of joining in an automobile seat frame according to a second modified example.

FIG. 6 is a diagram for explanation of a mode of joining in an automobile seat frame according to a second modified example. A welded portion 4B is provided in the seat frame according to this second modified example, instead of the welded portion 4 described above. Description of components (the back panel 2 and frame pipe 3) that are the same as those of the above described embodiment will be omitted hereinafter.

The welded portion 4B has a base portion 41, a first extended portion 42, and a second extended portion 43, similarly to the welded portion 4A, and also has: a third extended portion 44 extending in the longitudinal direction of the frame pipe 3 from an opposite end of the first extended portion 42, the opposite end being opposite to an end of the first extended portion 42, the end being connected to the base portion 41; and a fourth extended portion 45 extending in the longitudinal direction of the frame pipe 3 from an opposite end of the second extended portion 43, the opposite end being opposite to an end of the second extended portion 43, the end being connected to the base portion 41.

In this second modified example described above, the back panel 2 and the frame pipe 3 are joined to each other by the welded portion 4B. Similarly to the embodiment, the base portion 41 of the welded portion 4B joins the back panel 2 and frame pipe 3 each made of aluminum or an aluminum alloy to each other at the more inner position of the back panel 2 than the central axis N of the frame pipe 3 to thereby make a seat frame. This second modified example achieves increased strength against shear and peeling by formation of the welded portion 4B at a position satisfying the above described relation and as a result, enables firm joining of a plate member and a pipe member to each other.

Furthermore, the second modified example achieves: even more increased strength against shear by provision of the first extended portion 42 and second extended portion 43 extending in a direction in which shear loads are applied; and additionally even more increased strength against peeling by provision of the third extended portion 44 and fourth extended portion 45 extending in a direction in which peeling loads are applied.

A configuration in which the third extended portion 44 and the fourth extended portion extend in directions to approach each other has been described with respect to the second modified example, but a configuration in which the third extended portion 44 and the fourth extended portion 45 extend in directions to separate from each other may be adopted instead.

Third Modified Example

Figure 7:
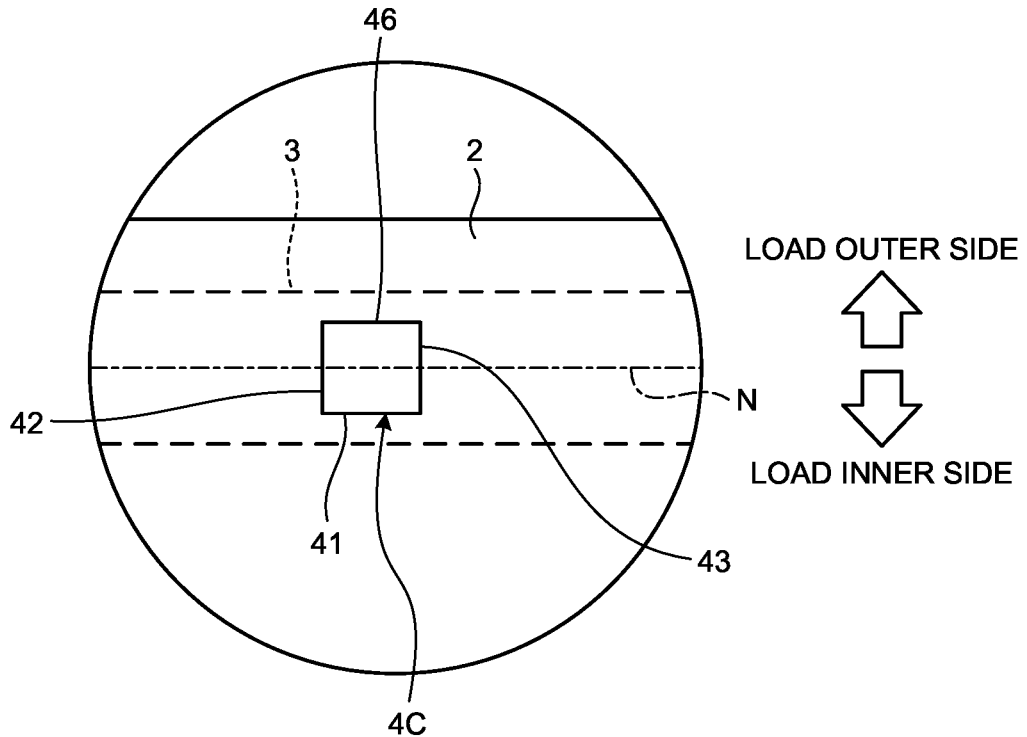
FIG. 7 is a diagram for explanation of a mode of joining in an automobile seat frame according to a third modified example.

FIG. 7 is a diagram for explanation of a mode of joining in an automobile seat frame according to a third modified example. A welded portion 4C is provided in the seat frame according to this third modified example, instead of the welded portion 4 described above. Description of components (the back panel 2 and frame pipe 3) that are the same as those of the above described embodiment will be omitted hereinafter.

The welded portion 4C has a base portion 41, a first extended portion 42, and a second extended portion 43, similarly to the welded portion 4A, and also has: a connecting portion 46 that connects an opposite end of the first extended portion 42 and an opposite end of the second extended portion 43 to each other, the opposite end of the first extended portion 42 being opposite to an end of the first extended portion 42, the end being connected to the base portion 41, the opposite end of the second extended portion 43 being opposite to an end of the second extended portion 43, the end being connected to the base portion 41. The welded portion 4C has a rectangular shape and joins the back panel 2 and the frame pipe 3 to each other.

In this third modified example described above, the back panel 2 and the frame pipe 3 are joined to each other by the welded portion 4C. Similarly to the embodiment, the base portion 41 of the welded portion 4C joins the back panel 2 and frame pipe 3 each made of aluminum or an aluminum alloy to each other at the more inner position of the back panel 2 than the central axis N of the frame pipe 3, to thereby make a seat frame. This third modified example achieves increased strength against shear and peeling by formation of the welded portion 4C at a position satisfying the above described relation and as a result, enables firm joining of a plate member and a pipe member to each other.

Furthermore, the third modified example achieves: even more increased strength against shear by provision of the first extended portion 42 and second extended portion 43 extending in a direction in which shear loads are applied; and additionally even more increased strength against peeling by provision of the connecting portion 46 extending in a direction in which peeling loads are applied.

Fourth Modified Example

Figure 8:
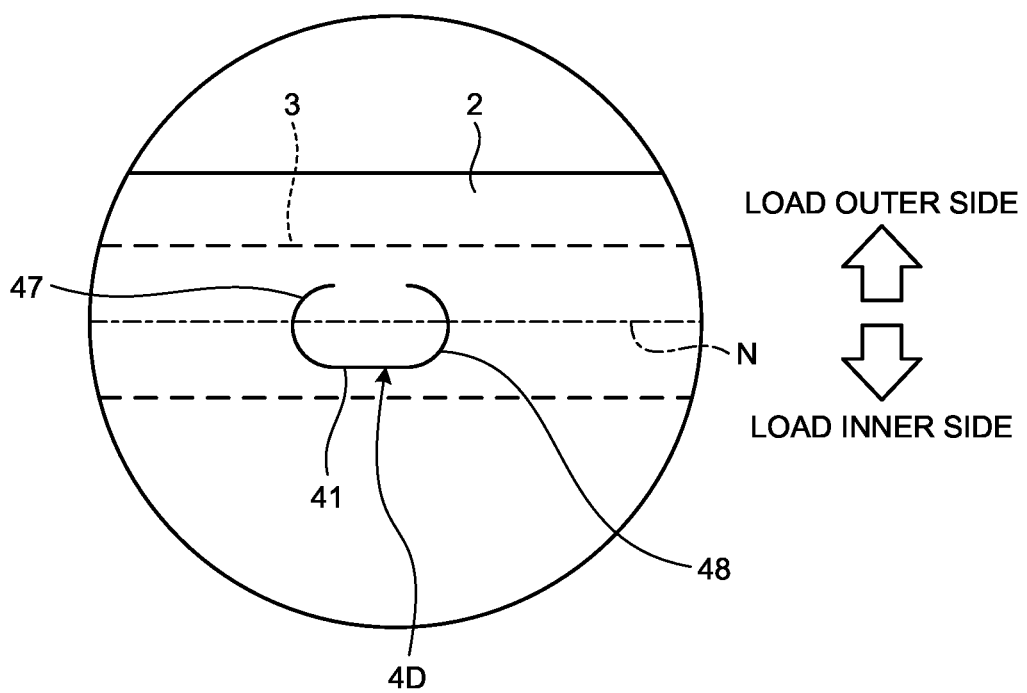
FIG. 8 is a diagram for explanation of a mode of joining in an automobile seat frame according to a fourth modified example.

FIG. 8 is a diagram for explanation of a mode of joining in an automobile seat frame according to a fourth modified example. A welded portion 4D is provided in the seat frame according to this fourth modified example, instead of the welded portion 4 described above. Description of components (the back panel 2 and frame pipe 3) that are the same as those of the above described embodiment will be omitted hereinafter.

The welded portion 4D has: a base portion 41 similar to that of the welded portion 4A; a first extended portion 47 extending in an arc shape toward the outside of the back panel 2 from one end of the base portion 41; and a second extended portion 48 extending in an arc shape toward the outside of the back panel 2 from the other end of the base portion 41. Both the first extended portion 47 and second extended portion 48 extend to positions that are more outside than the central axis N of the frame pipe 3.

In this fourth modified example described above, the back panel 2 and the frame pipe 3 are joined to each other by the welded portion 4D. Similarly to the embodiment, the base portion 41 of the welded portion 4D joins the back panel 2 and frame pipe 3 each made of aluminum or an aluminum alloy to each other at the more inner position of the back panel 2 than the central axis N of the frame pipe 3, to thereby make a seat frame. This fourth modified example achieves increased strength against shear and peeling by formation of the welded portion 4D at a position satisfying the above described relation and as a result, enables: firm joining of a plate member and a pipe member to each other; and weight reduction.

Furthermore, the fourth modified example achieves even more increased strength against shear and peeling by provision of the first extended portion 47 and second extended portion 48 each extending in an arc shape.

Fifth Modified Example

Figure 9:
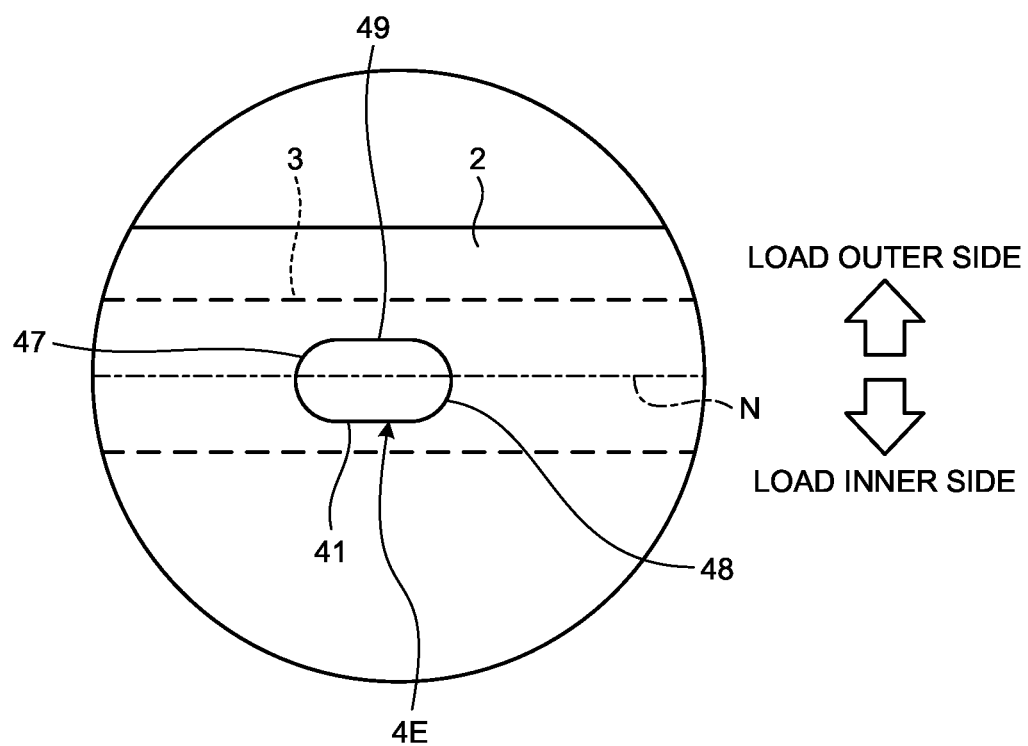
FIG. 9 is a diagram for explanation of a mode of joining in an automobile seat frame according to a fifth modified example.

FIG. 9 is a diagram for explanation of a mode of joining in an automobile seat frame according to a fifth modified example. A welded portion 4E is provided in the seat frame according to this fifth modified example, instead of the welded portion 4 described above. Description of components (the back panel 2 and frame pipe 3) that are the same as those of the above described embodiment will be omitted hereinafter.

The welded portion 4E has a base portion 41, a first extended portion 47, and a second extended portion 48, similarly to the welded portion 4D, and also has a connecting portion 49 that connects an opposite end of the first extended portion 47 and an opposite end of the second extended portion 48 to each other, the opposite end of the first extended portion 47 being opposite to an end of the first extended portion 47, the end being connected to the base portion 41, the opposite end of the second extended portion 48 being opposite to an end of the second extended portion 48, the end being connected to the base portion 41. The welded portion 4E has an approximate oval shape and joins the back panel 2 and the frame pipe 3 to each other.

In this fifth modified example described above, the back panel 2 and the frame pipe 3 are joined to each other by the welded portion 4E. Similarly to the embodiment, the base portion 41 of the welded portion 4E joins the back panel 2 and frame pipe 3 each made of aluminum or an aluminum alloy to each other at the more inner position of the back panel 2 than the central axis N of the frame pipe 3, to thereby make a seat frame. This fifth modified example achieves increased strength against shear and peeling by formation of the welded portion 4E at a position satisfying the above described relation and as a result, enables firm joining of a plate member and a pipe member to each other.

Furthermore, the fifth modified example enables even more increased strength against shear and peeling by provision of the first extended portion 47, the second extended portion 48, and the connecting portion 49.

Sixth Modified Example

Figure 10:
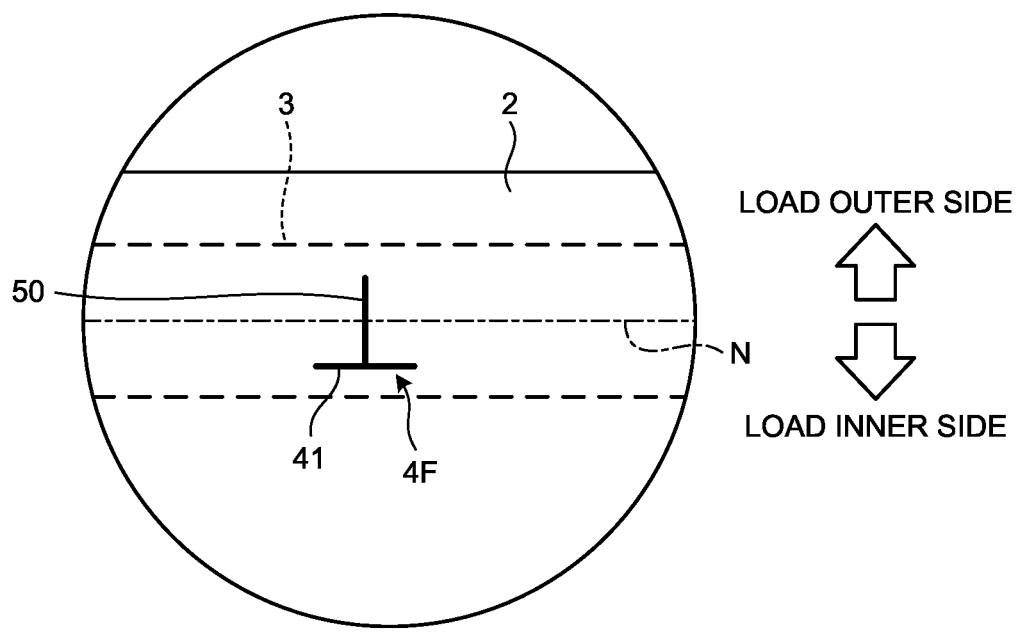
FIG. 10 is a diagram for explanation of a mode of joining in an automobile seat frame according to a sixth modified example.

FIG. 10 is a diagram for explanation of a mode of joining in an automobile seat frame according to a sixth modified example. A welded portion 4F is provided in the seat frame according to this sixth modified example, instead of the welded portion 4 described above. Description of components (the back panel 2 and frame pipe 3) that are the same as those of the above described embodiment will be omitted hereinafter.

The welded portion 4F has: a base portion 41 described above, and an extended portion 50 extending from a central portion of the base portion 41, the central portion being at the center of the longitudinal length of the base portion 41. The welded portion 4F has a T shape and joins the back panel 2 and the frame pipe 3 to each other.

In this sixth modified example described above, the back panel 2 and the frame pipe 3 are joined to each other by the welded portion 4F. Similarly to the embodiment, the base portion 41 of the welded portion 4F joins the back panel 2 and frame pipe 3 each made of aluminum or an aluminum alloy to each other at the more inner position of the back panel 2 than the central axis N of the frame pipe 3, to thereby make a seat frame. This sixth modified example achieves increased strength against shear and peeling by formation of the welded portion 4F at a position satisfying the above described relation and as a result, enables firm joining of a plate member and a pipe member to each other.

Furthermore, the sixth modified example achieves even more increased strength against shear by provision of the extended portion 50 extending in a direction in which shear loads are applied.

Seventh Modified Example

Figure 11:
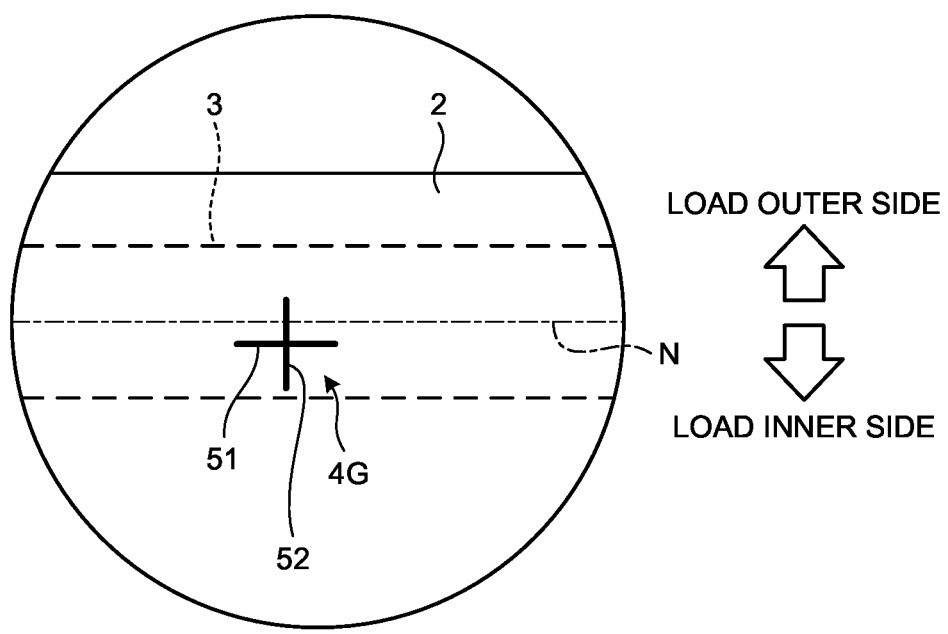
FIG. 11 is a diagram for explanation of a mode of joining in an automobile seat frame according to a seventh modified example.

FIG. 11 is a diagram for explanation of a mode of joining in an automobile seat frame according to a seventh modified example. A welded portion 4G is provided in the seat frame according to this seventh modified example, instead of the welded portion 4 described above. Description of components (the back panel 2 and frame pipe 3) that are the same as those of the above described embodiment will be omitted hereinafter.

The welded portion 4G has: a base portion 51 extending in the longitudinal direction of the frame pipe 3; and an extended portion 52 extending thorough a central portion of the base portion 51, the central portion being at the center of the longitudinal length of the base portion 51. The welded portion 4G has a cross (+) shape and joins the back panel 2 and the frame pipe 3 to each other.

In this seventh modified example described above, the back panel 2 and the frame pipe 3 are joined to each other by the welded portion 4G. Similarly to the embodiment, the base portion 41 of the welded portion 4G joins the back panel 2 and frame pipe 3 each made of aluminum or an aluminum alloy to each other at the more inner position of the back panel 2 than the central axis N of the frame pipe 3, to thereby make a seat frame. This seventh modified example achieves increased strength against shear and peeling by formation of the welded portion 4G at a position satisfying the above described relation and as a result, enables firm joining of a plate member and a pipe member to each other.

Furthermore, the seventh modified example achieves even more increased strength against shear by provision of the extended portion 52 extending in a direction in which shear loads are applied.

The welded portion is not necessarily T-shaped or cross-shaped as described above, and an H-shape, for example, is also applicable.

The present invention may thus include various embodiments not described herein, and various design changes, for example, may be made without departing from the technical ideas determined by the claims.

EXAMPLES

Examples of an automobile seat frame according to the present invention will be described hereinafter. The present invention is not limited to these examples.

For these examples, joined bodies that are each made of an aluminum alloy, are for strength measurement, each have a back panel and a frame pipe, and have different joint positions (positions where welded portions are formed) on their frame pipes were respectively made and shear strength and peeling strength of these joined bodies were measured. The materials for and shapes of the back panels and frame pipes used in the examples, their welding conditions (beam patterns, output, and irradiation time periods, for example), and shapes of their welded portions were the same. In these examples, the joined bodies for measurement were made by use of back panels made of an aluminum alloy of the 5000 series and frame pipes made of an aluminum alloy of the 7000 series.

Figure 12:
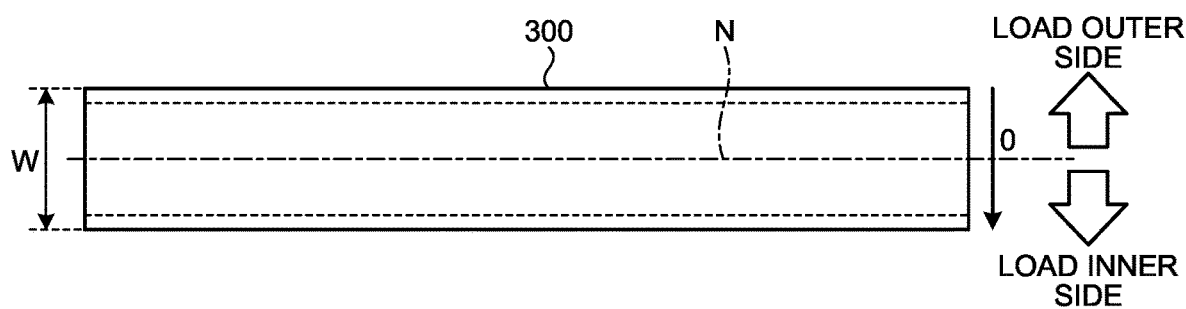
FIG. 12 is a diagram for explanation of welding positions according to examples of the present invention.

FIG. 12 is a diagram for explanation of welding positions according to the examples of the present invention. Along the width of a frame pipe 300, the position where a central axis N passes is zero.

Furthermore, along the width, the load inner side is referred to as a positive direction and the load outer side is referred to as a negative direction.

Example 1

The welded portion was formed at a zero position (on the central axis N) on the width of the frame pipe 300 as viewed along a thickness direction of the frame pipe 300. In this Example 1, shear strength and peeling strength were measured.

Example 2

The width direction length of the frame pipe 300 was W (see FIG. 4), and the welded portion was formed at a position shifted from the zero position by a length of W/8 in the positive direction along the width. In this Example 2, shear strength and peeling strength were measured and a calculation of the rates of change in strength in relation to Example 1 was made. Results of the calculation are listed in Table 1.

TABLE 1

| | Amount of shift | Rate of change in shear strength [%] | Rate of change in peeling strength [%] |
|---|---|---|---|
| First Example | 0 | — | — |
| Second Example | W/8 | 4.9% | 11.7% |
| Third Example | W/4 | 5.0% | 14.3% |
| First Comparative Example | −W/8 | −0.1% | −17.5% |
| Second Comparative Example | −W/4 | −3.4% | −56.3% |

Example 3

The welded portion was formed at a position shifted from the zero position by a length of W/4 in the positive direction along the width. In this Example 2, shear strength and peeling strength were measured and the rates of change in strength in relation to Example 1 were calculated.

Comparative Example 1

The welded portion was formed at a position shifted from the zero position by the length of W/8 in the negative direction along the width. In this Comparative Example 1, shear strength and peeling strength were measured and the rates of change in strength in relation to Example 1 were calculated.

Comparative Example 2

The welded portion 4 was formed at a position shifted from the zero position by the length of W/4 in the negative direction along the width. In this Comparative Example 1, shear strength and peeling strength were measured and the rates of change in strength in relation to Example 1 were calculated.

Figure 13:
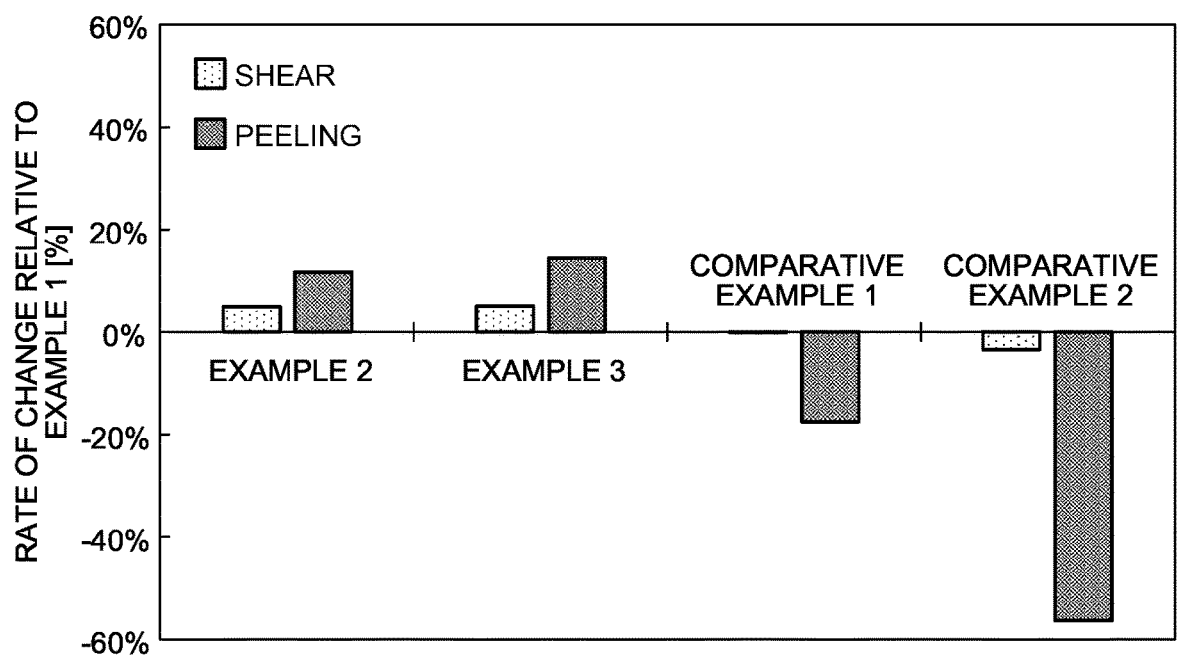
FIG. 13 is a diagram illustrating rates of change in shear strength and peeling strength in Examples 2 and 3 and Comparative Examples 1 and 2, in relation to Example 1.

FIG. 13 is a diagram illustrating rates of change in shear strength and peeling strength for Examples 2 and 3 and Comparative Examples 1 and 2, in relation to Example 1. It illustrates that the joined bodies according to Examples 2 and 3 have increased shear strength and peeling strength as compared to that of Example 1 having the welded portion formed on the central axis N. By contrast, the joined bodies according to Comparative Examples 1 and 2 have decreased shear strength and peeling strength, as compared to that of Example 1. These results indicate that providing the welded portion 4 to the load inner side achieves increased strength against shear and peeling as compared to a case where a welded portion is formed on the central axis N.

INDUSTRIAL APPLICABILITY

As described above, a joined body and an automobile seat frame according to the present invention are suitable for achievement of both strength against shear loads and strength against peeling loads.

REFERENCE SIGNS LIST

1 AUTOMOBILE SEAT FRAME
2 BACK PANEL
3 FRAME PIPE
4, 4A to 4F WELDED PORTION
41 BASE PORTION
42, 47 FIRST EXTENDED PORTION
43, 48 SECOND EXTENDED PORTION
44 THIRD EXTENDED PORTION
45 FOURTH EXTENDED PORTION
46, 49 CONNECTING PORTION
50 EXTENDED PORTION

The invention claimed is:

1. A seat frame comprising:
a plate member; and
a bar member joined to the plate member, the bar member including a planar portion on at least part of a side surface of the bar member, wherein
a planar portion of the plate member and the planar portion of the bar member are joined to each other by a welded portion including a base portion configured to: extend in a longitudinal direction of the bar member; and have a central line positioned closer to a position at which a load from a user is applied upon use of the seat frame than a central portion of the bar member, the central portion being at a center of a length of the bar member, the length being orthogonal to the longitudinal direction of the bar member, the position being in an area of contact between the plate member and the planar portion,
wherein the welded portion includes:
a first extended portion configured to extend linearly beyond the central portion from one end of the base portion in a direction intersecting the longitudinal direction of the bar member; and
a second extended portion configured to extend linearly beyond the central portion from an other end of the base portion in a direction intersecting the longitudinal direction of the bar member.

2. The seat frame according to claim 1, wherein the welded portion is provided on an opposite side of the central portion of the bar member, the central portion being at the center of the length orthogonal to the longitudinal direction of the bar member, the opposite side being opposite to a side where an outer edge of the plate member is.

3. The seat frame according to claim 1, wherein the welded portion further includes:
a third extended portion configured to extend from an opposite end of the first extended portion in the longitudinal direction of the bar member, the opposite end being opposite to an end of the first extended portion, the end being connected to the base portion; and
a fourth extended portion configured to extend from an opposite end of the second extended portion in the longitudinal direction of the bar member, the opposite end being opposite to an end of the second extended portion, the end being connected to the base portion.

4. The seat frame according to claim 1, wherein the welded portion further includes:
a connecting portion configured to connect an opposite end of the first extended portion and an opposite end of the second extended portion to each other, the opposite end of the first extended portion being opposite to an end of the first extended portion, the end being connected to the base portion, the opposite end of the second extended portion being opposite to an end of the second extended portion, the end being connected to the base portion.

5. The seat frame according to claim 1, wherein the bar member has a rectangular cross section cut along a plane orthogonal to the longitudinal direction.

6. The seat frame according to claim 1, wherein the bar member is tubular.

7. The seat frame according to claim 1, wherein the plate member and the bar member are made of aluminum or an aluminum alloy.

\* \* \* \* \*